United States Patent
Plocher et al.

(10) Patent No.: US 9,644,974 B2
(45) Date of Patent: May 9, 2017

(54) MODEL-BASED GENERATION OF INFORMATION AND EVACUATION MESSAGES

(75) Inventors: Tom Plocher, Hugo, MN (US); Enyi Chen, Beijing (CN); John Beane, Shoreview, MN (US); Andrew Berezowski, Wallingford, CT (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 50 days.

(21) Appl. No.: 14/351,906

(22) PCT Filed: Oct. 19, 2011

(86) PCT No.: PCT/CN2011/001741
§ 371 (c)(1),
(2), (4) Date: Oct. 5, 2015

(87) PCT Pub. No.: WO2013/056395
PCT Pub. Date: Apr. 25, 2013

(65) Prior Publication Data
US 2016/0018226 A1    Jan. 21, 2016

(51) Int. Cl.
*G01C 21/20*    (2006.01)
*A62B 3/00*    (2006.01)
(Continued)

(52) U.S. Cl.
CPC .............. *G01C 21/206* (2013.01); *A62B 3/00* (2013.01); *G08B 7/066* (2013.01); *G09F 9/33* (2013.01); *G09F 27/00* (2013.01); *G09G 3/3208* (2013.01)

(58) Field of Classification Search
CPC ........ G08B 21/00; G08B 23/00; G01C 21/20; G09G 3/3208; A62B 3/00
(Continued)

(56) References Cited

U.S. PATENT DOCUMENTS 6,313,549 B1 * 11/2001 Moisan .................. G08B 7/062
307/66
6,646,545 B2 * 11/2003 Bligh ..................... G08B 7/062
340/286.05
(Continued)

FOREIGN PATENT DOCUMENTS

CN        201130488 Y     10/2008
CN        201441760 U      4/2010
(Continued)

OTHER PUBLICATIONS

European search report for corrsponding EP application 11874190.9, dated Jul. 14, 2015.
(Continued)

*Primary Examiner* — Tan Q Nguyen
(74) *Attorney, Agent, or Firm* — Husch Blackwell LLP

(57) ABSTRACT

A system includes one or more computer processors configured to receive structure data for a building, receive location data relating to a plurality of sensors positioned throughout the building, receive data from the sensors, and determine one or more of a safe space within the building and a safe evacuation route through the building as a function of the building structure, the location of the plurality of sensors, and the sensor data. The system further includes a plurality of display units positioned throughout the building and configured to display one or more of a message relating to an event within the building, an instruction on where to proceed in the building, and symbols indicating a direction for evacuation out of the building as a function of one or more of the safe space and the safe evacuation route.

17 Claims, 4 Drawing Sheets

(51) Int. Cl.
 *G09F 27/00* (2006.01)
 *G08B 7/06* (2006.01)
 *G09F 9/33* (2006.01)
 *G09G 3/3208* (2016.01)

(58) Field of Classification Search
 USPC ............... 701/428, 410, 420, 437; 340/577; 707/102
 See application file for complete search history.

(56) References Cited

U.S. PATENT DOCUMENTS

| | | | | |
|---|---|---|---|---|
| 6,778,071 | B2* | 8/2004 | Megerle | G08B 7/066 116/202 |
| 7,800,511 | B1* | 9/2010 | Hutchison | G08B 7/066 340/3.1 |
| 2007/0272497 | A1* | 11/2007 | Kawai | B66B 5/021 187/393 |
| 2007/0279210 | A1 | 12/2007 | Li et al. | |
| 2008/0157984 | A1 | 7/2008 | Li et al. | |
| 2009/0066522 | A1 | 3/2009 | Lee et al. | |
| 2010/0245083 | A1 | 9/2010 | Lewis | |
| 2011/0241877 | A1 | 10/2011 | Wedig et al. | |

FOREIGN PATENT DOCUMENTS

| | | |
|---|---|---|
| CN | 201684316 U | 12/2010 |
| DE | 102 38 891 A1 | 3/2004 |
| FR | 2 896 993 A1 | 8/2007 |
| JP | 2006-331150 | 12/2006 |
| JP | 2007-11830 | 1/2007 |

OTHER PUBLICATIONS

International Search Report for corresponding PCT Application PCT/CN2011/001741, mailing date Aug. 2, 2012.
English-language Abstract for CN 201684316 U.
English-language Abstract for CN 201130488 Y.
English-language Abstract for JP 2006-331150.
English-language Abstract for JP 2007-11830.
Second Office Action from corresponding CN patent application 201180074266.5, dated Mar. 24, 2016.
English language translation of Second Office Action from corresponding CN patent application 201180074266.5, dated Mar. 24, 2016.
English-language abstract of CN patent publication 201441760 U, publication date Apr. 28, 2010.

* cited by examiner

MODEL-BASED GENERATION OF INFORMATION AND EVACUATION MESSAGES

TECHNICAL FIELD

The present disclosure relates to a system and method for model-based generation of information and evacuation messages.

BACKGROUND

Light emitting diode (LED) displays (and other changeable message display units) have been widely adopted in many buildings, such as airports, railway stations, shopping malls, and subway stations, for the instant display of information. Currently however, such units can display only predefined messages entered when an event, such as a fire, occurs since such systems are configured in near real time from a control center. Additionally, when such systems are changeable by input from a human operator, the chance of error is great, especially in light of the circumstances of intense psychological pressure in emergency events such as a fire. Therefore, adapting any message or other information can be awkward, delayed, and susceptible to error.

DETAILED DESCRIPTION

In an embodiment, information display units that are positioned throughout a building or other structure can be used as emergency information displays as part of a multi-model approach for transmitting information to building occupants during an emergency or other event and/or in directing the evacuation of such occupants. Specifically, a real time visual notification system displays emergency messages on a light emitting diode (LED) or other changeable display units that are positioned throughout the building. In the event of an emergency or other event, the displays will display emergency messages. The displays can further generate color changes that demand attention.

By showing, in real time, an evacuation direction and where a hazard or event is located, the system of display units throughout the building or other structure assists occupants of the building to evacuate to a safe space. The display units at the different positions throughout the building show different messages or symbols according to the fire, smoke, intruder, or other potentially harmful situation.

An embodiment uses a model-based method to adaptively generate information messages (such as "There is a fire in the east lobby"), directional messages (such as "Don't enter" or "Proceed to . . . "), or symbols (evacuation directions) for an evacuation on a display unit according to the building structure, the location of the display unit, and the particular event, such as a fire. Information is generated regarding a safe evacuation route for each display unit location in the building according to the building structure information, the events from detectors, and an estimation of smoke, heat, light, or intruder path propagation. An embodiment generates a message and a symbol on the different display unit locations and different display unit orientations in the building to assist the evacuation along a safe egress. An embodiment displays, in real time, well-designed messages or symbols on the display unit at different locations with different orientations.

Figure 1:
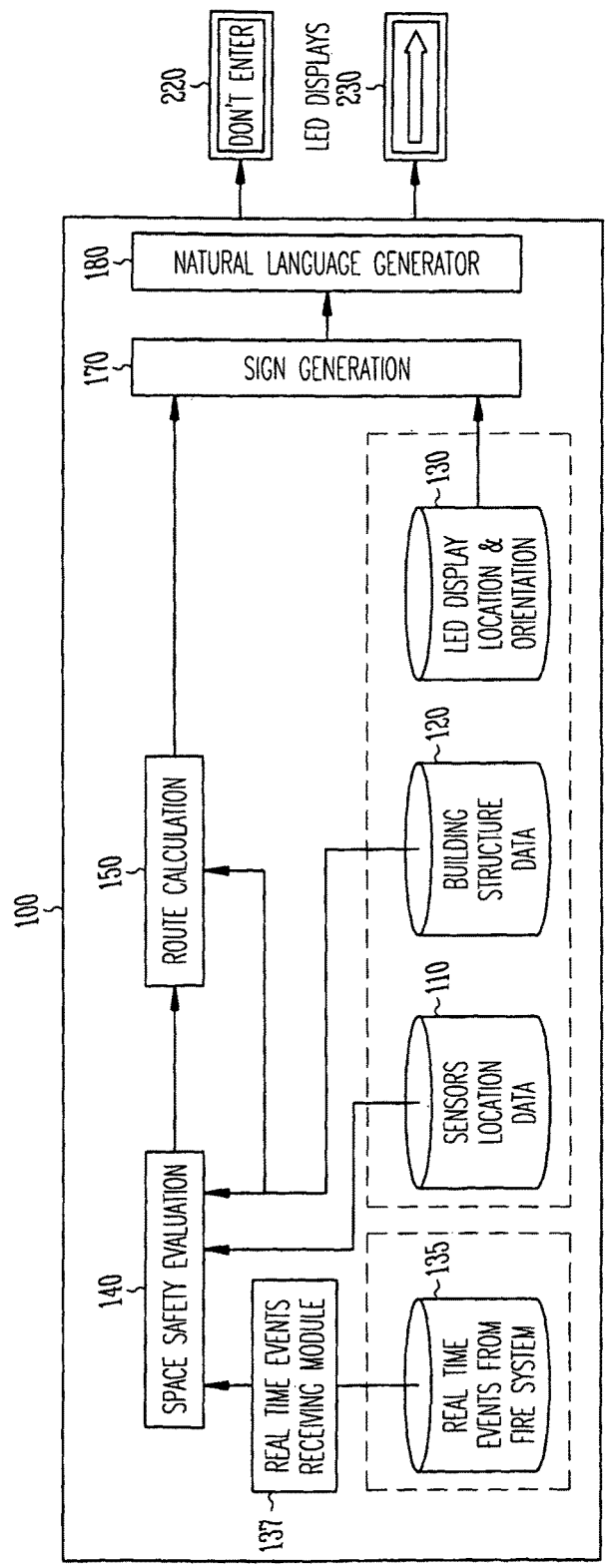
FIG. 1 is a block diagram of a system for displaying information and direction messages on display units positioned throughout a building.

FIG. 1 is a block diagram illustrating a system 100 for displaying information and direction messages on display units positioned throughout a building. The system 100 includes a database 110 containing data relating to the type and location of sensors in the building, a database 120 relating to the structure of the building, and a database 130 that includes the location and orientation of the display units positioned throughout the building. These databases can be referred to collectively as the building data management module and include data, such as building structure data (e.g., BIM/IFC data), location of the sensors, and location and orientation of the display units. This data can first be pre-installed in the system and, thereafter, updated when necessary, such as when there is a change in the floor plan or the fire system.

A processor or module 137 receives data from sensors positioned throughout the building. This data can be stored in a real time events database 135. This processor 137 can be referred to as the real time events receiving module. The data received by the processor 137 can indicate the occurrence of events throughout the building and can include data from a smoke detector, a heat detector, toxic gas detector, a motion detector, and an infrared detector, to list a few examples.

A space safety evaluation processor or module 140 receives model data of a floor plan. In an embodiment, this data is building information model (BIM) data and/or IFC data. The processor 140 creates a grid-based map of the floor plan on a display unit and assigns different values or colors to the grids. For example, the processor 140 can mark all of the walls as red (indicating that there is no egress through the wall) and mark all of the other grids as green. Thereafter, the processor 140 updates the grid map according to an event or events. For example, if smoke is detected, then the grids near the smoke detector will be marked as red. Similarly, if a toxic gas is detected, then the grids near the gas detector will be marked as red.

A route calculation processor or module 150 calculates a safe evacuation route. The processor 150 can use the grid generated by the space safety evaluation processor 140. The route calculation processor can examine the grid, mark routes along green grids as safe for egress, and mark routes along red grids as dangerous and not to be taken. For each display unit, the optimal route can be calculated with an A* algorithm to egress. The route calculation processor 150 can also calculate and the display units can display the distance from a display unit to the event location and the orientation of the display unit to the event location.

A sign generation processor or module 170 causes each display unit to display an information message or a direction message. As noted, the rule-based sign generation is a function of a display unit's location and orientation. For example, if a display unit is near an event and oriented away from the event, then the display could display "Do Not Enter." If the display unit is positioned near the event and oriented towards the event, then the display unit could display "Proceed to Lobby." A natural language generator processor or module 180 is coupled to the sign generation processor 170 to aid in the conveyance of messages via the display units.

Figure 2:
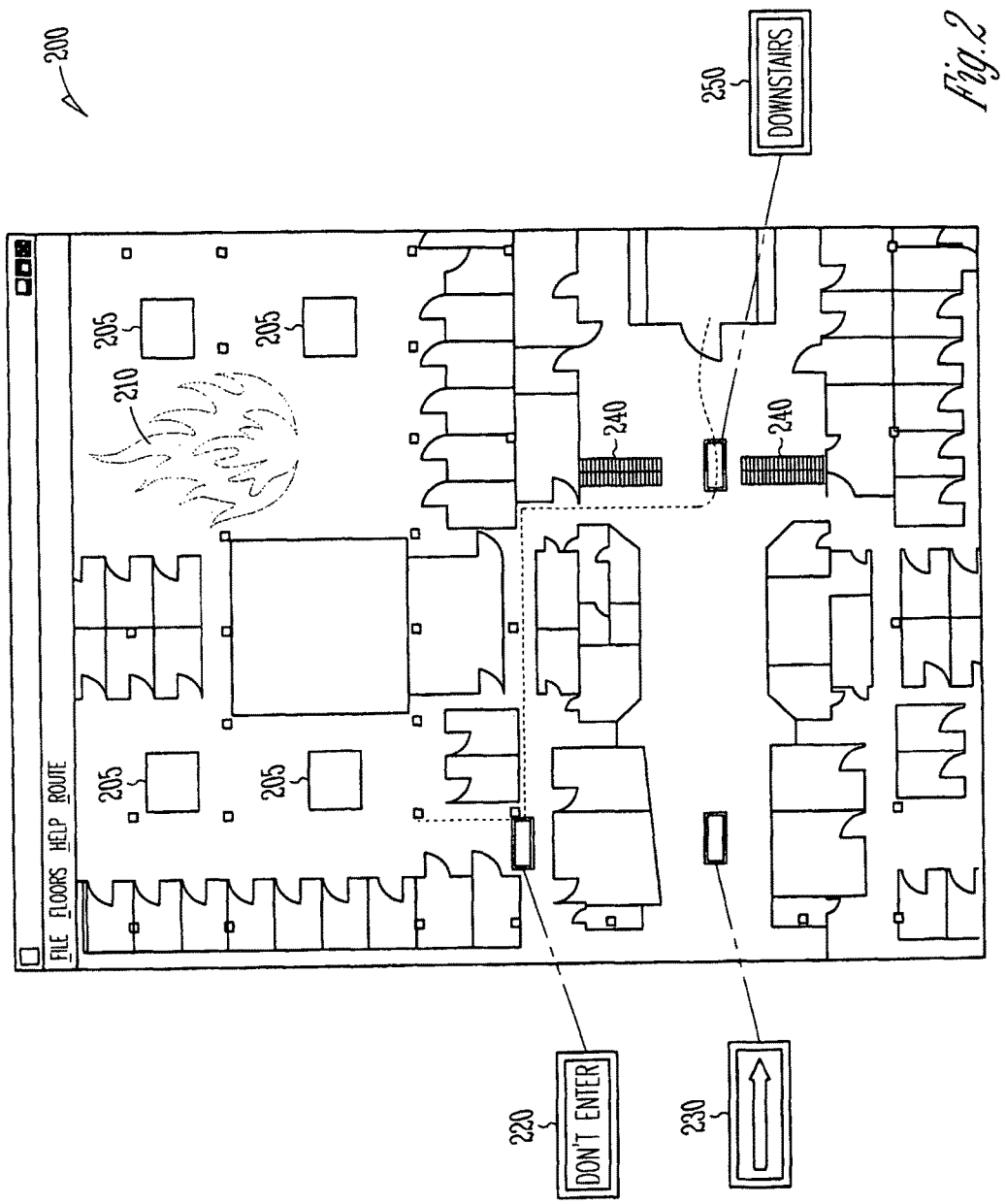
FIG. 2 illustrates a floor plan of a floor of a building including positions of display units.

FIG. 2 illustrates a floor plan 200 of a building. This floor plan can be generated from or be part of a building information model (BIM). As illustrated in FIG. 2, a fire 210 or other event can be detected in a certain area of the building. The sensors 205 (heat, smoke, light, toxic gas) that detect the fire transmit data to a processor indicating the occurrence of a fire or other event. The processor, having knowledge of the location of the sensor(s) that sensed the event and the location and orientation of the display units, causes the pertinent display units to display information, instructions, and/or directions to the occupants of the building. As illustrated in FIG. 2, the display unit 220 displays on its side that is facing away from the event a "Don't Enter" message because entry therein will lead to the hazardous area where the fire 210 is located. The display unit 220 further displays on its side that is facing the event a message, such as "Proceed to Stairs," in order to lead occupants away from the fire. The display unit 230 displays an arrow pointing in the direction of a stairwell 240, and the display unit 250 displays a message indicating the way to go downstairs.

Figure 3A:
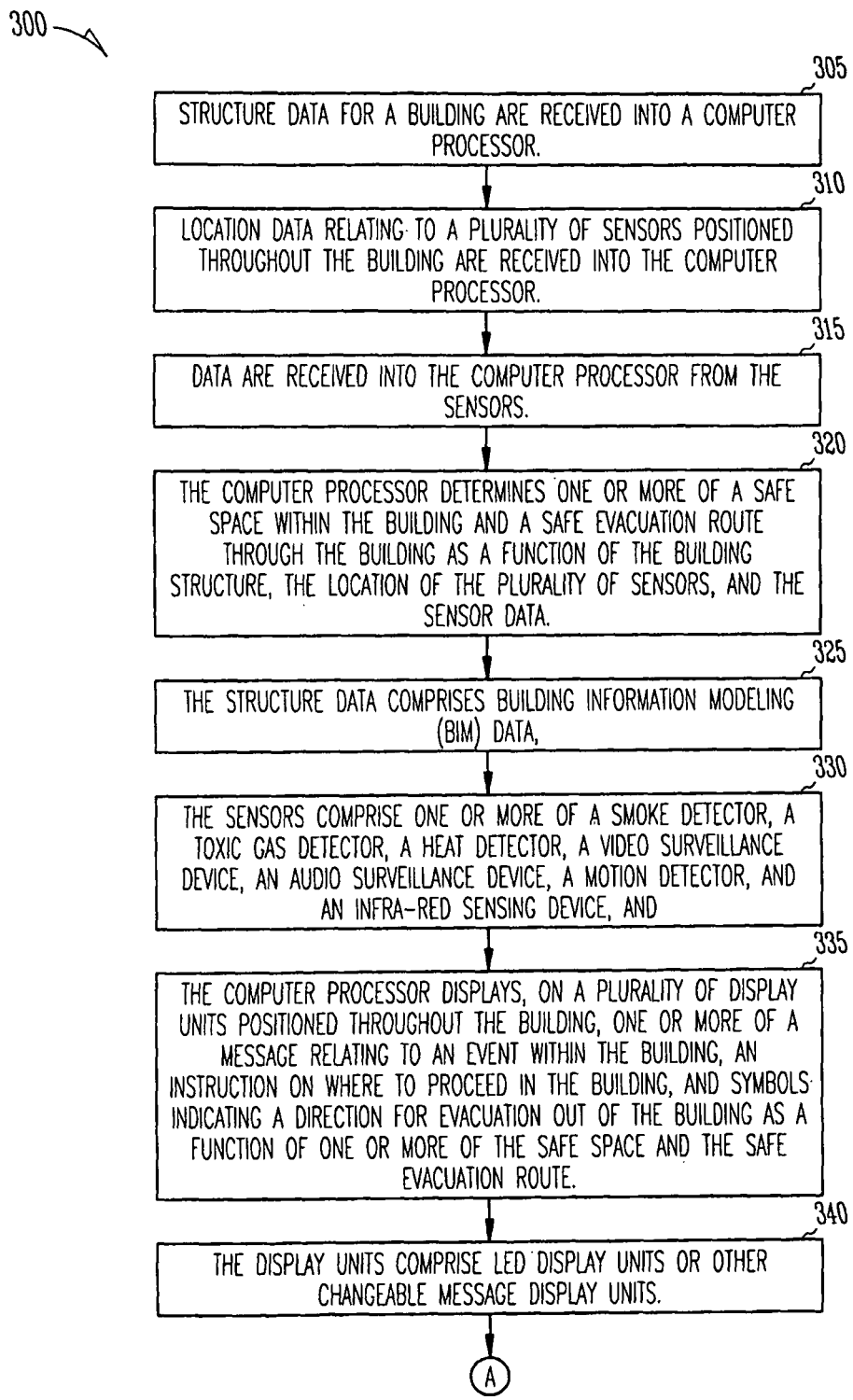
FIGS. 3A and 3B are a flow chart of a process to display information on a plurality of display units positioned throughout a building or other structure as a function of the building structure, the location of a plurality of sensors, and sensor data.
Figure 3B:
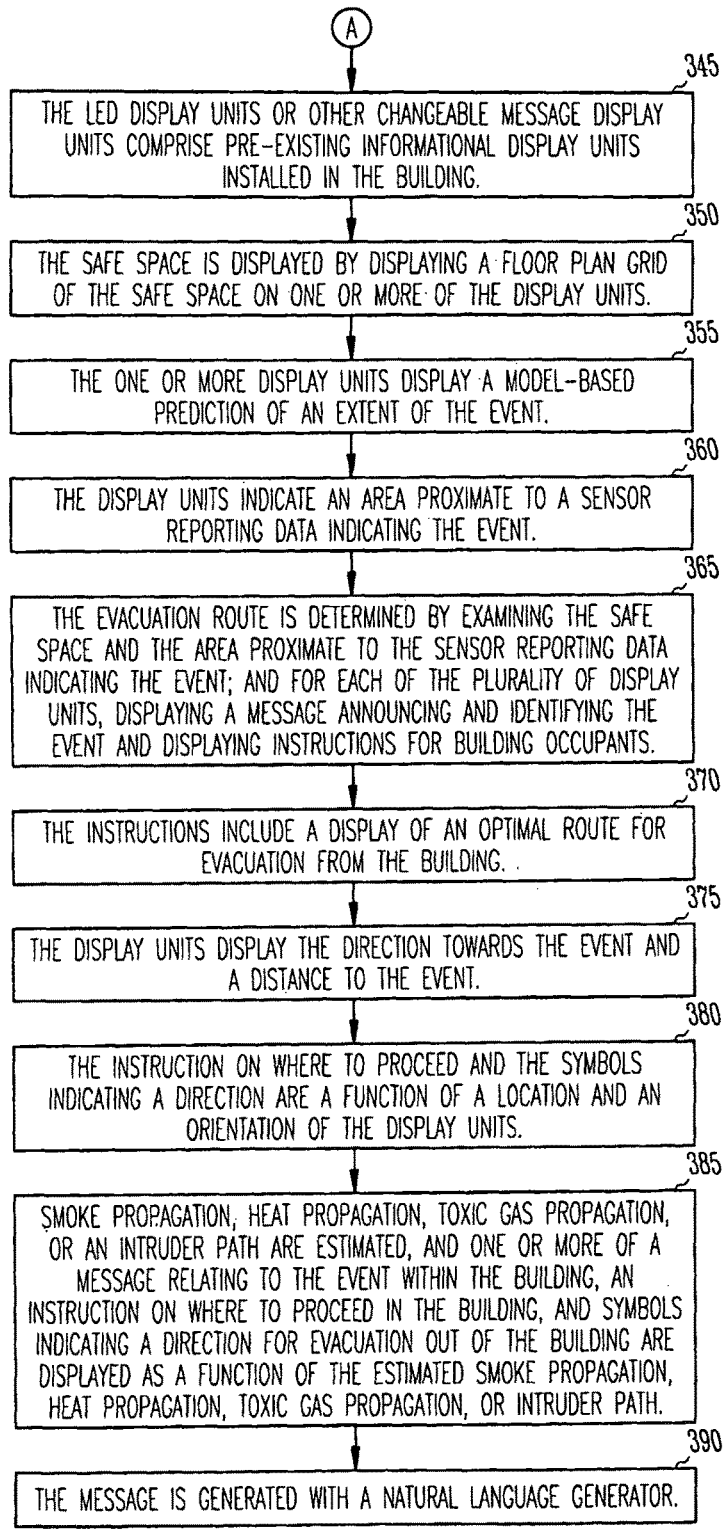

FIGS. 3A and 3B are a flowchart of an example process 300 for displaying information on a plurality of display units positioned throughout a building or other structure as a function of the building structure, the location of a plurality of sensors, and sensor data. FIG. 3 includes a number of process blocks 305-390. Though arranged serially in the example of FIGS. 3A and 3B, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring to FIGS. 3A and 3B, at 305, structure data for a building is received into a computer processor. At 310, location data relating to a plurality of sensors positioned throughout the building is received into the computer processor. At 315, data is received into the computer processor from the sensors. At 320, the computer processor determines one or more of a safe space within the building and a safe evacuation route through the building as a function of the building structure, the location of the plurality of sensors, and the sensor data. At 325, the computer processor displays, on a plurality of display units positioned throughout the building, one or more of a message relating to an event within the building, an instruction on where to proceed in the building, and symbols indicating a direction for evacuation out of the building as a function of one or more of the safe space and the safe evacuation route.

At 330, the structure data comprises building information modeling (BIM) data, at 335, the sensors comprise one or more of a smoke detector, a toxic gas detector, a heat detector, a video surveillance device, an audio surveillance device, a motion detector, and an infra-red sensing device, and at 340, the display units comprise LED display units or other changeable message display units. At 345, the LED display units or other changeable message display units comprise pre-existing informational display units installed in the building.

At 350, the safe space is displayed by displaying a floor plan grid of the safe space on one or more of the display units. At 355, the one or more display units display a model-based prediction of an extent of the event. At 360, the display units indicate an area proximate to a sensor reporting data indicating the event. At 365, the evacuation route is determined by examining the safe space and the area proximate to the sensor reporting data indicating the event, and, for each of the plurality of display units, displaying a message announcing and identifying the event and displaying instructions for building occupants. At 370, the instructions include a display of an optimal route for evacuation from the building.

At 375, the display units display the direction towards the event and a distance to the event. At 380, the instruction on where to proceed and the symbols indicating a direction are a function of a location and an orientation of the display units. At 385, smoke propagation, heat propagation, toxic gas propagation, or an intruder path are estimated, and one or more of a message relating to the event within the building, an instruction on where to proceed in the building, and symbols indicating a direction for evacuation out of the building are displayed as a function of the estimated smoke propagation, heat propagation, toxic gas propagation, or intruder path. At 390, the message is generated with a natural language generator.

It should be understood that there exist implementations of other variations and modifications of the invention and its various aspects as may be readily apparent, for example, to those of ordinary skill in the art and that the invention is not limited by specific embodiments described herein. Features and embodiments described above may be combined with each other in different combinations. It is, therefore, contemplated to cover any and all modifications, variations, combinations, or equivalents that fall within the scope of the present invention.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the description of the embodiments with each claim standing on its own as a separate example embodiment.

The invention claimed is:

1. A system comprising:
 a computer processor configured to receive structure data for a building, location data relating to a plurality of sensors positioned throughout the building, and sensor data from the plurality of sensors;
 a plurality of display units positioned throughout the building and configured to display a message relating to an event within the building, an instruction on where to proceed in the building, and a symbol indicating a direction for evacuation out of the building,
 wherein the computer processor determines one or more of a safe space within the building and a safe evacuation route through the building as a function of the structure data, the location data, and the sensor data,
 wherein each of the plurality of display units includes a location and an orientation within the building, and wherein the computer processor generates the message, the instruction, or the symbol for displaying on a respective one of the plurality display units as a function of one or more of the location and the orientation of the respective one of the plurality display units, the safe space, and the safe evacuation route.

2. The system of claim 1, wherein the structure data includes building information modeling (BIM) data.

3. The system of claim 1, wherein each of the plurality of sensors includes one or more of a smoke detector, a toxic gas detector, a heat detector, a video surveillance device, an audio surveillance device, a motion detector, and an infrared sensing device.

4. The system of claim 1, wherein the plurality of display units includes light emitting diode (LED) display units or other changeable message display units.

5. The system of claim 4, wherein the LED display units or the other changeable message display units are pre-existing information display units installed in the building.

6. The system of claim 1, wherein the computer processor generates a floor plan grid of the safe space to be displayed on one or more of the plurality display units.

7. The system of claim 6, wherein the computer processor calculates a model-based prediction of an extent of the event to be displayed on the one or more of the plurality of display units.

8. The system of claim 6, wherein an area proximate to one of the plurality of sensors reporting the sensor data indicating the event is displayed on the one or more of the plurality of display units.

9. The system of claim 8, wherein the computer processor determines the safe evacuation route as a function of the area proximate to the one of the plurality of sensors reporting the sensor data indicating the event.

10. The system of claim 9, wherein the message, the instruction, or the symbol displayed on the respective one of the plurality of display units shows the safe evacuation route.

11. The system of claim 1, wherein the message, the instruction, or the symbol displayed on the respective one of the plurality of display units includes a direction towards the event and a distance to the event.

12. The system of claim 1, wherein the computer processor is configured to estimate smoke propagation, heat propagation, toxic gas propagation, or an intruder path, and
wherein computer processor generates the message, the instruction, or the symbol as a function of the smoke propagation, the heat propagation, the toxic gas propagation, or the intruder path.

13. The system of claim 1, wherein the computer processor includes a natural language generator for generation of the message the instruction, or the symbol.

14. A process comprising:
receiving, into a computer processor, structure data for a building;
receiving, into the computer processor, location data relating to a plurality of sensors positioned throughout the building;
receiving, into the computer processor, data from the plurality of sensors;
determining, using the computer processor, one or more of a safe space within the building and a safe evacuation route through the building as a function of the structure data, the location data, and the sensor data; and
displaying, on a plurality of display units positioned throughout the building, one or more of a message relating to an event within the building, an instruction on where to proceed in the building, and a symbol indicating a direction for evacuation out of the building,
wherein each of the plurality of display units includes a location and an orientation within the building, and
wherein the computer processor generates the message, the instruction, or the symbol for displaying on a respective one of the plurality of display units as a function of one or more of the location and the orientation of the respective one of the plurality of display units, the safe space, and the safe evacuation route.

15. The process of claim 14, further comprising estimating smoke propagation, heat propagation, toxic gas propagation, or an intruder path, wherein the computer processor generates the message, the instruction, or the symbol as a function of the smoke propagation, the heat propagation, the toxic gas propagation, or the intruder path.

16. A computer readable medium comprising instructions that, when executed by a processor, execute a process comprising:
receiving structure data for a building;
receiving location data relating to a plurality of sensors positioned throughout the building;
receiving data from the plurality of sensors;
determining one or more of a safe space within the building and a safe evacuation route through the building as a function of the structure data, the location data, and the sensor data; and
displaying, on a plurality of display units positioned throughout the building, one or more of a message relating to an event within the building, an instruction on where to proceed in the building, and a symbol indicating a direction for evacuation out of the building,
wherein each of the plurality of display units includes a location and an orientation within the building, and
wherein the message, the instruction, or the symbol displayed on a respective one of the plurality of display units are generated by the processor as a function of one or more of the location and the orientation of the respective one of the plurality of display units, the safe space, and the safe evacuation route.

17. The computer readable medium of claim 16, further comprising instructions for estimating smoke propagation, heat propagation, toxic gas propagation, or an intruder path, and wherein the message, the instruction, or the symbol displayed on the respective one of the plurality of display units are generated by the processor as a function of the smoke propagation, the heat propagation, the toxic gas propagation, or the intruder path.

* * * * *